(12) United States Patent
Wu et al.

(10) Patent No.: US 9,369,634 B2
(45) Date of Patent: Jun. 14, 2016

(54) DISPLAY DEVICE AND DISPLAY METHOD

(71) Applicant: BOE TECHNOLOGY GROUP CO., LTD., Beijing (CN)

(72) Inventors: Naifu Wu, Beijing (CN); Chiachiang Lin, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/422,848

(22) PCT Filed: Jul. 11, 2014

(86) PCT No.: PCT/CN2014/082052
§ 371 (c)(1),
(2) Date: Feb. 20, 2015

(87) PCT Pub. No.: WO2015/096457
PCT Pub. Date: Jul. 2, 2015

(65) Prior Publication Data
US 2016/0037084 A1    Feb. 4, 2016

(30) Foreign Application Priority Data

Dec. 27, 2013 (CN) .......................... 2013 1 0741436

(51) Int. Cl.
*H04N 5/262* (2006.01)
*H04N 3/12* (2006.01)
(Continued)

(52) U.S. Cl.
CPC ............. *H04N 5/2624* (2013.01); *H04N 3/127* (2013.01); *H04N 5/44504* (2013.01); *H04N 5/44591* (2013.01); *H04N 7/0117* (2013.01); *H04N 9/67* (2013.01); *H04N 13/0409* (2013.01); *H04N 21/4402* (2013.01); *H04N 2013/0463* (2013.01)

(58) Field of Classification Search
CPC . H04N 5/2624; H04N 3/127; H04N 5/44504; H04N 5/44591; H04N 7/0117; H04N 9/67
See application file for complete search history.

(56) References Cited

U.S. PATENT DOCUMENTS

| 2003/0037330 A1 | 2/2003 | Makofka |
| 2007/0035706 A1* | 2/2007 | Margulis ................ G03B 21/00 353/122 |

(Continued)

FOREIGN PATENT DOCUMENTS

| CN | 201601736 U | 10/2010 |
| CN | 102186038 A | 9/2011 |

(Continued)

OTHER PUBLICATIONS

International Search Report for International Application No. PCT/CN2014/082052.

*Primary Examiner* — Brian P. Yenke
*Assistant Examiner* — Sean Haiem
(74) *Attorney, Agent, or Firm* — Nath, Goldberg & Meyer; Joshua E. Goldberg; Leonid D. Goldberg (57) ABSTRACT

The present invention relates to a display device and a display method. The display device comprises a display panel and a video stream provider, wherein the display panel comprises a display screen and a separation module; the video stream provider provides one or two video streams, the one or two video streams are coded before entering the display screen to form a video signal source, and the video signal source is input to the display screen in a single-channel form; and when the video stream provider provides two video streams, the separation module separates a picture displayed in the display screen into two pictures respectively specific to the two video streams to realize double-view display. In the present invention, the two video streams are provided by the same video stream provider and may be previously coded, so that the complexity of transmission of the video signal source is greatly reduced.

18 Claims, 5 Drawing Sheets

(51) Int. Cl.
*H04N 21/4402* (2011.01)
*H04N 13/04* (2006.01)
*H04N 7/01* (2006.01)
*H04N 5/445* (2011.01)
*H04N 9/67* (2006.01)

(56) References Cited

U.S. PATENT DOCUMENTS

2010/0225751 A1* 9/2010 Nemeth ............. H04N 13/0438
 348/58

2010/0231699 A1* 9/2010 Jalbout .............. H04N 13/0434
 348/57
2012/0026157 A1* 2/2012 Unkel .................... G09G 3/003
 345/419

FOREIGN PATENT DOCUMENTS

| CN | 102254513 A | 11/2011 |
| CN | 202050504 U | 11/2011 |
| CN | 102714028 A | 10/2012 |
| CN | 102948160 A | 2/2013 |
| CN | 103329194 A | 9/2013 |
| CN | 103747320 A | 4/2014 |

\* cited by examiner

Fig. 1

--Prior Art--

DISPLAY DEVICE AND DISPLAY METHOD

This is a National Phase Application filed under 35 U.S.C. 371 as a national stage of PCT/CN2014/082052, filed Jul. 11, 2014, an application claiming the benefit of Chinese Application No. 201310741436.1, filed Dec. 27, 2013, the content of each of which is hereby incorporated by reference in its entirety.

FIELD OF THE INVENTION

The present invention relates to the field of display technology, and particularly relates to a display device and a display method.

BACKGROUND OF THE INVENTION

With the development of display technology, a double-view (also called as double-view-field) display device appears in recent years. Double-view display is a new technology for viewing the contents of two pictures from the same display screen along with the change of viewing angles, namely a one-screen double-display mode, e.g. in a car, a driver views navigation information and various types of driving prompt information, and a passenger on the passenger seat views other programs such as sports programs, fashion programs, entertainment programs or the like; or in family life, all family members may view pictures of different programs through a television. This humanized "double-view" function well meets different requirements of car passengers and family members for information contents. Of course, if everyone wants to view the pictures of the same content, the television may be adjusted to a normal mode at any time.

Figure 1:
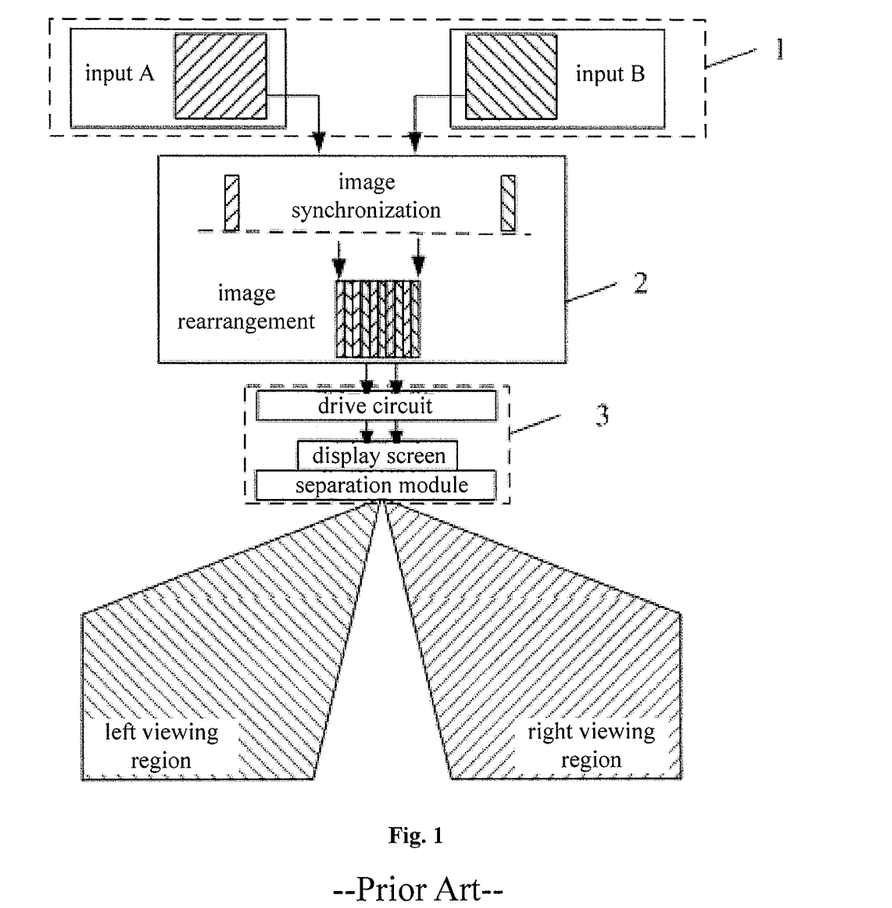
FIG. 1 is a structural schematic diagram of a double-view display device in the prior art.

Two video signals adopted by a traditional double-view display device for double-view-field display respectively come from two signal sources independent from each other, e.g. as shown in an input end 1 of FIG. 1, a vehicular PC (input A) and a vehicular DVD (input B) respectively provide a video stream and are respectively connected to a processor 2 through a signal wire, and the processor 2 performs coding such as image synchronization, image rearrangement or the like on the two video streams and then feeds the coded video streams to a display screen 32 (2VF Screen) for double-view-field display. Wherein, the processor 2 for processing the two video streams is independent from the display screen 32, the vehicular PC and the vehicular DVD.

However, at present, this technology for realizing double-view display is merely realized by using two independent signal sources, and a processing component for processing the video signals from the two signal sources to realize the double-view display is positioned outside the two signal sources, so the system for realizing the double-view display in the prior art is complex in structure, occupies a large space and is inconvenient to operate. In addition, the video signals from the two signal sources are respectively transmitted to the display screen through respective channels for display, so that the transmission of the video signals is complex. Therefore, the existing structure for realizing the double-view display is expected to be improved, so that the double-view display may be realized by using one play device (e.g. a PC).

SUMMARY OF THE INVENTION

For solving the above technical problems in the prior art, the present invention provides a double-view display device and a double-view display method, for facilitating double-view display and greatly reducing the complexity of transmission of a video signal source.

The technical solutions adopted for solving the technical problems of the present invention involve a double-view display device, including a display panel and a video stream provider, wherein the display panel includes a display screen and a separation module; the video stream provider provides one or two video streams, the one or two video streams are coded before entering the display screen to form a video signal source, and the video signal source is input to the display screen in a single-channel form; and when the video stream provider provides two video streams, the separation module separates a picture displayed in the display screen into two pictures respectively specific to the two video streams to realize double-view display.

Preferably, the separation module is arranged on one side, close to audiences or far from audiences, of the display panel.

Preferably, the display panel further includes a comparison module, the input end of the comparison module is connected with the output end of the video stream provider, the output end of the comparison module is connected with the input end of the separation module, and the comparison module is used for judging whether the video signal source includes two video streams and controlling the separation module to be turned on or off based on the judging result.

Preferably, the double-view display device further includes a processing module for coding two video streams to form the video signal source, wherein the coding includes image rearrangement or image interpolation.

Preferably, the processing module is arranged in the video stream provider; or, the display panel further includes a drive circuit electrically connected with the display screen, and the processing module is arranged in the drive circuit.

Preferably, the drive circuit further includes a signal conversion module for converting the signal format of the received coded video signal source and inputting the converted video signal source to the display screen.

Preferably, the signal format output by the processing module is DVI, the signal format input to the display screen is LDVS, and the signal conversion module converts a DVI signal into an LDVS signal.

Preferably, the separation module is a controllable active grating.

Preferably, the active grating is a twisted nematic liquid crystal cell, and matched polarizers are arranged in the display screen and the twisted nematic liquid crystal cell.

Preferably, the two pictures respectively specific to the two video streams are displayed on the display screen in a regional interval manner, and the regional interval manner includes a row regional interval manner, a column regional interval manner or a block regional interval manner.

The technical solutions adopted for solving the technical problems of the present invention involve a display method, including:

providing one or two video streams;

coding the one or two video streams to form a video signal source; and inputting the video signal source to a display screen in a single-channel manner for display.

Preferably, the display method further includes: before the video signal source is input to the display screen, or after the video signal source is input to the display screen, judging whether a picture to be displayed on the display screen is separated to realize double-view display.

Preferably, the one or two video streams are provided by the same video stream provider, and are coded in the video stream provider; or the one or two video streams are coded in a drive circuit of the display screen.

Preferably, the inputting the video signal source to a display screen in a single-channel form specifically includes: converting the signal format of the video signal source, and inputting the format-converted video signal source to the display screen.

Preferably, the display method further includes:

judging whether the video signal source includes two video streams;

when the video signal source includes two video streams, separating a picture displayed in the display screen to realize double-view display; and when the video signal source includes a single video stream, keeping displaying the picture in the display screen.

The present invention has the beneficial effects: two video streams are previously coded before being input to the display screen to form the video signal source, and then the video signal source is input to the display screen in the single-channel form; meanwhile, whether the picture displayed in the display screen is separated to realize double-view display is judged according to the property of the video signal source. In the present invention, the two video streams are provided by the same video stream provider and may be previously coded in the video stream provider or the drive circuit, so that the complexity of transmission of the video signal source is greatly reduced and the structure of the double-view display device is simpler.

DETAILED DESCRIPTION OF THE EMBODIMENTS

To make those skilled in the art better understand the technical solutions of the present invention, a double-view display device and a double-view display method of the present invention will be further described in details below in combination with the accompanying drawings and specific implementations.

Embodiment 1

Figure 2:
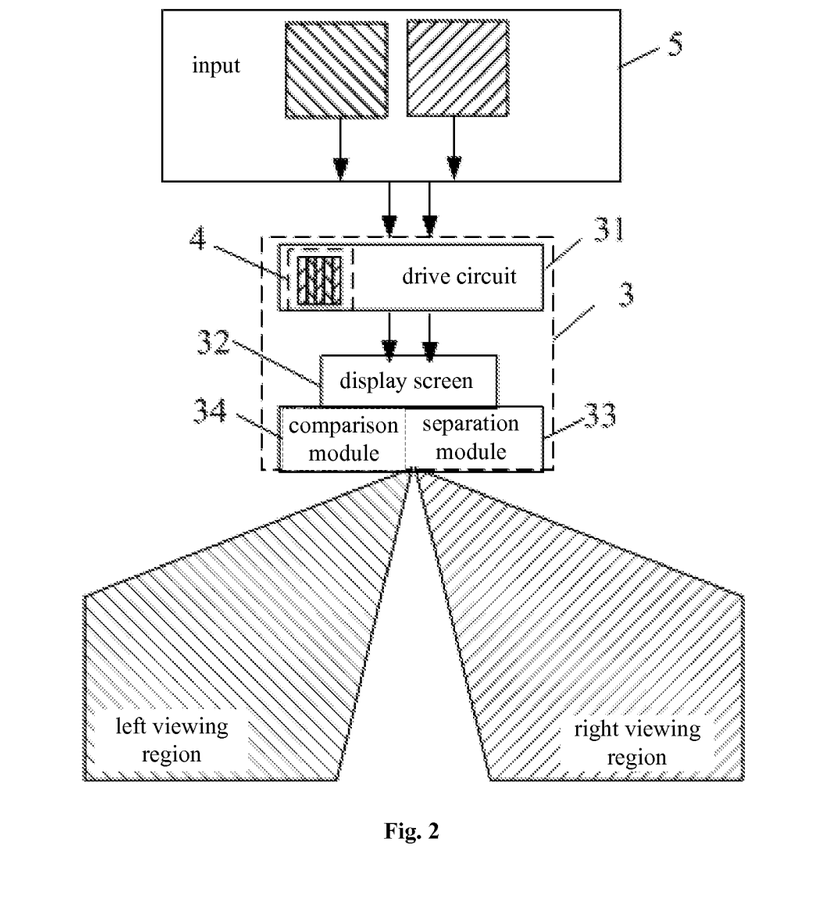
FIG. 2 is a structural schematic diagram of a double-view display device according to Embodiment 1 of the present invention.

As shown in FIG. 2, this embodiment provides a double-view display device, including a display panel 3, wherein the display panel 3 includes a display screen 32; the double-view display device further includes a video stream provider 5, wherein the video stream provider 5 is used for providing two video streams, the two video streams are coded before being input to the display screen 32 to form a video signal source, and then the video signal source is input to the display screen 32 in a single-channel form. In this embodiment, a single channel may be interpreted as a data transmission line.

In the double-view display device, the display panel 3 further includes a separation module 33, the separation module 33 is arranged on one side, close to audiences, of the display panel 3, and the separation module 33 is used for separating a picture, specific to two video streams, to be displayed in the display screen 32 to realize double-view display. In this embodiment, the separation module 33 adopts a grating structure, which will be described below. When the video signal source is input to the display screen 32, the display screen 32 displays the picture in a specific form; and after the displayed picture is separated by the separation module 33, two pictures respectively specific to the two video streams are displayed in the display panel 3. In this embodiment, the audiences watch the displayed pictures in a naked eye manner, the watched displayed pictures are the two pictures displayed in the display panel 3, and this is realized under the cooperation of the display screen 32 and the separation module 33.

To solve the complexity of transmission of the signal source in the double-view display technology, the two video streams are input to the display screen 32 in the form of the video signal source through a single channel in this embodiment; meanwhile, preferably, the two video streams are provided by the same video stream provider 5 to meet the play requirement of the double-view display technology, the two video streams are previously coded by a processing module 4, and coding includes image rearrangement or image interpolation. In this embodiment, the display screen 32 is a liquid crystal display screen, the double-view display device further includes a drive circuit 31 electrically connected with the liquid crystal display screen, the processing module 4 is arranged in the drive circuit 31, and the output end of the processing module 4 is connected with the input end of the liquid crystal display screen.

In this case, when the processing module 4 mixes the two different video streams, an appropriate mixing rule is adopted by comprehensively considering the factors such as the pixel structure of the display screen 32, the opening size of the grating of the separation module 33, the manner of image rearrangement, the watching distance or the like. For a mixed video stream file, a special sign may be added to the header of a video stream file, and the special sign facilitates the operation of identifying whether it is a mixed video signal source including a plurality of video streams in subsequent processing. Correspondingly, the display screen 32 displays the two pictures specific to the two video streams in a regional interval manner, and the regional interval manner includes a row regional interval manner, a column regional interval manner or a block regional interval manner. That is, in the display screen 32, the picture specific to each video stream is displayed in the regional interval manner, namely displayed in a transverse multi-strip interval manner or a longitudinal multi-strip interval manner or a multi-block manner, and the display precision is preferably pixel level. Through the display manner of this embodiment, the audiences may have a good watching experience within a large viewing angle range by using an image synthesis mechanism without reducing the size of an overall picture displayed specific to each video stream.

In this embodiment, the drive circuit 31 further includes a signal conversion module (not shown in FIG. 2) for converting the signal format of the received coded video signal source and inputting the converted video signal source to the display screen 32. In this case, the video signal source is output from the processing module 4 to the signal conversion module in a DVI (Digital Visual Interface) signal format and is input to the display screen 32 in an LVDS (Low-Voltage Differential Signaling) signal format after the format is converted by the signal conversion module, and the signal conversion module converts a DVI signal into an LDVS signal. The DVI is a video interface of digital signal transmission and may directly transmit a digital signal to the display screen without conversion, so that the conversion process of D-A-D (digital-analog-digital) is omitted, and the DVI has the advantages of high speed, clear pictures, convenience in upgrade and the like. However, the DVI may not directly drive a timing controller in the display screen 32, so after a conventional video stream, e.g. a signal in a VGA format or a TMDS format, is input to the display panel, the signal must be converted into a signal in an LVDS format.

The double-view display device further includes a comparison module 34, the input end of the comparison module 34 is connected with the output end of the video stream provider 5, the output end of the comparison module 34 is connected with the input end of the separation module 33, and the comparison module 34 is used for judging whether the video signal source includes two video streams and controlling the separation module 33 to be turned on or off based on the judging result. When the comparison module 34 judges that the video signal source includes two video streams, the separation module 33 is turned on to separate a picture to realize double-view display. In this embodiment, the separation module 33 is a controllable active grating. Specifically, the separation module 33 may be a twisted nematic liquid crystal cell. Due to the controllability of twisted nematic liquid crystal, the twisted nematic liquid crystal cell is equivalent to an active grating and may adjust light passing therein.

Matched polarizers are respectively arranged in the liquid crystal display screen and the twisted nematic liquid crystal cell. Specifically, the liquid crystal display screen includes an array substrate and a color filter substrate which are subjected to cell aligning, a liquid crystal layer is arranged between the array substrate and the color filter substrate, a polarizer is arranged on each of the opposite outer sides of the array substrate and the color filter substrate, e.g. a first polarizer is arranged on the outer side of the array substrate, a second polarizer is arranged on the outer side of the color filter substrate, and the polarization directions of the first polarizer and the second polarizer are orthogonal. The twisted nematic liquid crystal cell includes substrates arranged on two sides and a twisted nematic liquid crystal layer arranged between the two substrates, the twisted nematic liquid crystal cell is further at least provided with a third polarizer, and the polarization direction of the third polarizer is the same as that of the first polarizer or the second polarizer. By adopting two polarization directions, crosstalk of polarized light may be reduced, and the display effect of images may be improved.

Figure 3:
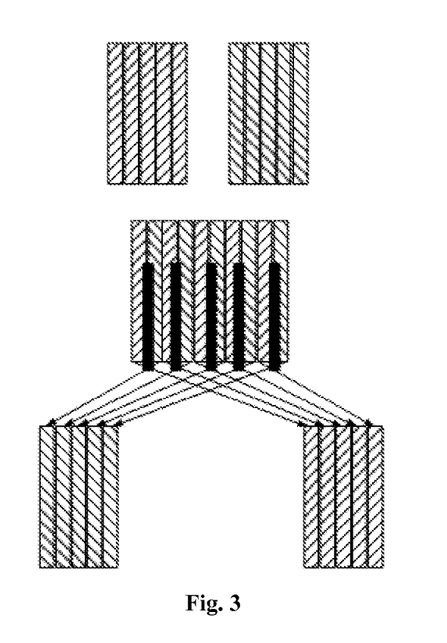
FIG. 3 is a schematic diagram illustrating picture separation performed by a separation module according to Embodiment 1 of the present invention.

To improve the integration level of the double-view display device and reduce the number of the polarizers in the double-view display device, the third polarizer in the twisted nematic liquid crystal cell may be arranged on any side of the twisted nematic liquid crystal cell, but the polarization direction of the third polarizer is the same as that of the polarizer, closer to the third polarizer, arranged on the array substrate or the color filter substrate in the liquid crystal display screen. For example, in this embodiment, the separation module 33 is arranged on one side, close to audiences, of the display panel, namely the twisted nematic liquid crystal cell is arranged close to the color filter substrate and enables the third polarizer to be positioned on one side far from the liquid crystal layer, then the polarization direction of the third polarizer is the same as that of the second polarizer. FIG. 3 is a schematic diagram of video interpolation in the twisted nematic liquid crystal cell taking a column regional interval manner as an example. At the same moment, the polarization direction of light entering the twisted nematic liquid crystal cell is changed in a column interval manner in the twisted nematic liquid crystal cell, so that pictures displayed on the liquid crystal display screen at corresponding positions are respectively displayed in the column regional interval manner, and the audiences at different positions may respectively watch different pictures.

Compared with the double-view display device in the prior art, the double-view display device in this embodiment integrates a device for providing video signals, and two devices generally providing two video streams in the prior art are integrated into one device, so that a video stream input end 1 is reduced and an independent processor 2 is reduced; and the functions of the processor 2 are realized by the processing module 4 integrated in the display screen, so that the complexity of transmission of the video signal source may be greatly reduced, and the space is also saved.

Correspondingly, this embodiment provides a double-view display method, including:

Step S1): the same video stream provider provides two video streams. In this embodiment, an application is: two players (e.g. StormPlayer, WMP player) are opened at the same time on a host interface of a vehicular PC (serving as the video stream provider 5), and the two players are distributed on the left side and right side of a video window of the host interface of the vehicular PC and play at the same time. Because the two video streams are previously coded by the processing module, the properties of video signals do not need to be considered, as long as the two software players in the video stream provider 5 (vehicular PC in this embodiment) are capable of playing, and the video window of the vehicular PC is capable of playing in accordance with the aspect ratio of the screen of the display device.

Step 2): one or two video streams are coded to form a video signal source.

In this embodiment, a video provided by the same video stream provider 5 and played by one or two players is input to the drive circuit 31, and the two video streams are coded in the processing module 4 of the drive circuit 31 to form a video signal source.

Step S3): the video signal source is input to the display screen in a single-channel form for display.

In this embodiment, the inputting the video signal source to the display screen 32 in the single-channel form specifically includes: converting the signal format of the coded video signal source by the signal conversion module, and inputting the format-converted video signal source to the display screen 32 in an LVDS format.

In this case, before the video signal source is input to the display screen, or after the video signal source is input to the display screen, whether a picture is separated to realize double-view display may be judged. Specifically, as shown in the flow of realizing double-view display in FIG. 4, whether the video signal source includes two video streams is judged first; when the video signal source includes two video streams, the picture displayed in the display screen 32 is separated to realize double-view display, namely a double-view mode; and when the video signal source includes a single video stream, the picture displayed in the display screen 32 is kept, namely a normal mode.

Figure 6:
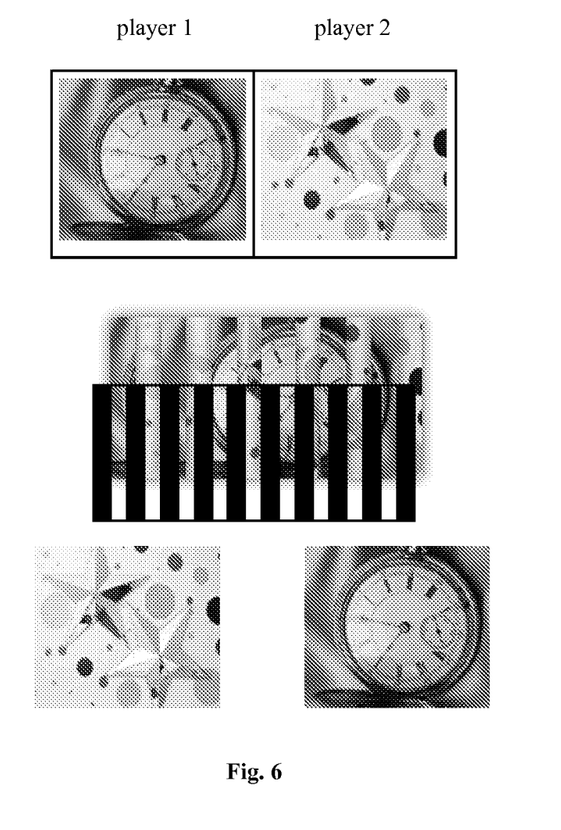
FIG. 6 is a schematic diagram of a double-view display picture according to Embodiment 1 of the present invention.

The specific working process is as follows: the liquid crystal layer in the liquid crystal display screen is deflected under the action of an electric field, so as to realize display of images; meanwhile, the comparison module 34 receives a video stream signal from the processing module 4 and makes a judgment; when the video signal source includes two video streams, the comparison module 34 executes control to enable the liquid crystal in the twisted nematic liquid crystal cell to deflect, so that a picture is separated into two pictures respectively specific to two different video streams displayed in different regions of the liquid crystal display screen, namely the displayed picture in the liquid crystal display screen is separated, so that audiences may watch the pictures of different contents from different viewing angles. For example, the display resolution of the liquid crystal display screen (namely 2VF Screen herein) is 800*600, and when two players are opened at the same time on the host interface of the vehicular PC, the horizontal-vertical ratio of the display screen of each player is set as 2:3 (400:600), and the two players play respectively on the left half screen and the right half screen of the screen of the display device, as shown in FIG. 6. In fact, the display manner herein is an example of the foregoing block regional interval display manner.

It should be understood herein that, the liquid crystal display screen in this embodiment may be divided into a plurality of display regions as required, and the two video streams in this embodiment may be displayed in set display regions (e.g. the lower side of the left half screen and the upper side of the right half screen); and further, based on double-view display of this embodiment, one-screen multi-display may be realized through image rearrangement and matching design of the active grating in the separation module.

Embodiment 2

This embodiment provides a double-view display device. This embodiment differs from Embodiment 1 in that, the relative positions of the twisted nematic liquid crystal cell and the liquid crystal display screen in this embodiment are different, and the arrangement position of the processing module is changed.

Figure 5:
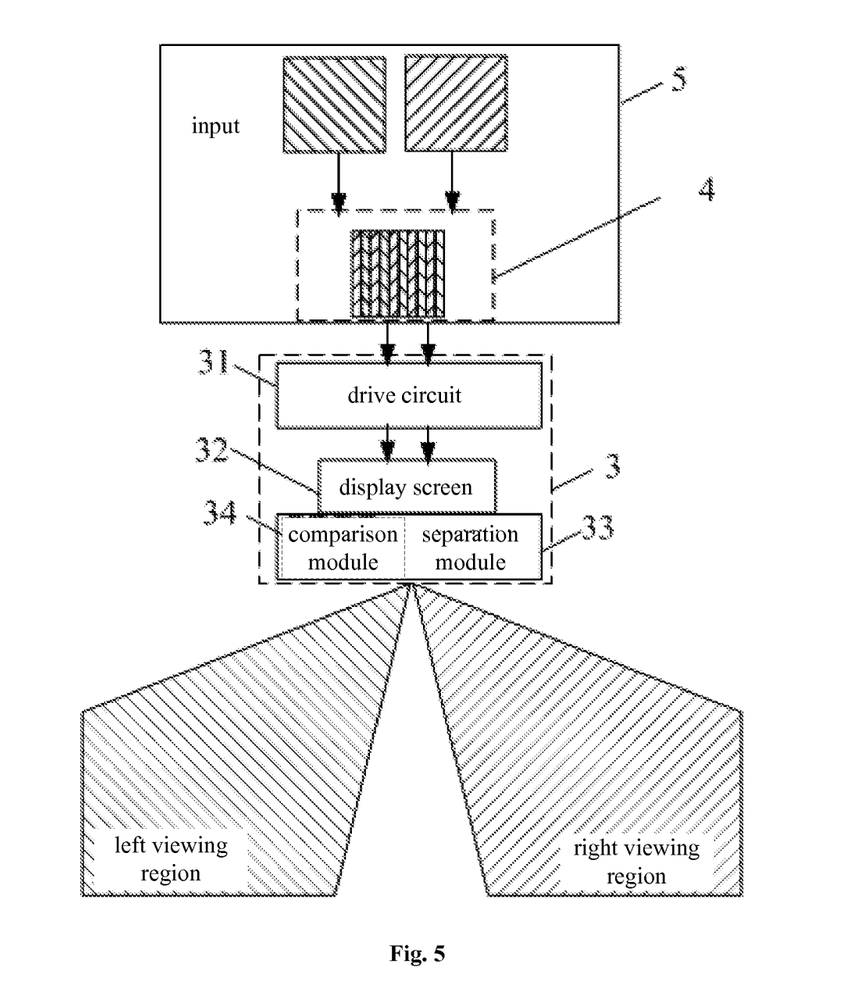
FIG. 5 is a structural schematic diagram of a double-view display device according to Embodiment 2 of the present invention.

In the double-view display device provided by this embodiment, as shown in FIG. 5, two video streams are coded in the video stream provider 5. Moreover, the separation module 33 is arranged on one side, not facing audiences, of the display panel 3, namely the twisted nematic liquid crystal cell is arranged close to the array substrate and enables the third polarizer to be positioned on one side far from the liquid crystal layer, and the polarization direction of the third polarizer is the same as that of the first polarizer.

Figure 4:
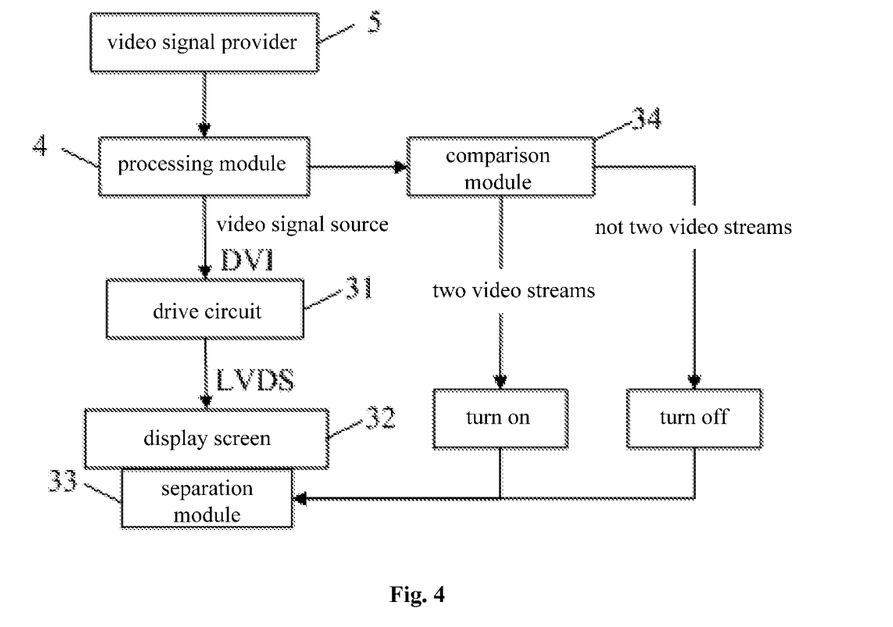
FIG. 4 is a schematic diagram illustrating a flow of realizing double-view display according to Embodiment 1 of the present invention.

Similarly, in this embodiment, referring to the flow in FIG. 4, based on the coding performed by the processing module 4 provided by the video stream provider 5 together with the twisted nematic liquid crystal cell serving as the active grating, the comparison module 34 sends an enabling signal to the active grating after identifying that the video signal source includes two video streams, so as to switch to a double-view mode.

Other structures of the double-view display device and the method for realizing double-view display in this embodiment are the same as those in Embodiment 1, which will not be redundantly described herein.

Embodiment 3

This embodiment differs from Embodiments 1 and 2 in that, the display screen in this embodiment is an OLED display device.

In this embodiment, a conventional OLED device may be adopted, polarizers are additionally arranged on two sides of the OLED device respectively, and the polarization directions of the polarizers are matched with the polarization direction of the polarizer in the separation module, so as to separate displayed pictures.

Other structures of the double-view display device and the method for realizing double-view display in this embodiment are similar to those in Embodiment 1 or 2, which will not be redundantly described herein.

The display device in the present invention may be any product or component with a display function, such as a liquid crystal panel, an electronic paper, an OLED panel, a mobile phone, a tablet computer, a television, a display, a notebook computer, a digital photo frame, a navigator or the like, and double-view display may be realized in the above display device by adopting the corresponding double-view display method.

In the present invention, the two video streams provided by the same video stream provider are previously coded to form the video signal source, and the video signal source is converted from a signal in a DVI format to a signal in an LVDS format and then input to the display screen in a single-channel form; and with the separation module, double-view-field display is realized. In the present invention, the two video streams are provided by the same video stream provider and may be previously coded in the video stream provider or in the drive circuit of the display panel, so that the complexity of transmission of the video signal source is greatly reduced and the structure of the double-view display device is simpler.

It could be understood that, the above implementations are merely exemplary implementations adopted for describing the principle of the present invention, rather than limiting the present invention. Various variations and improvements may be made for those of ordinary skill in the art without departing from the spirit and essence of the present invention, and these variations and improvements are deemed to be within the protection scope of the present invention.

The invention claimed is:

1. A display device, comprising a display panel and a video stream provider, wherein the display panel comprises a display screen and a separation module;

the video stream provider provides one or two video streams, the one or two video streams are coded before entering the display screen to form a video signal source, and the video signal source is input to the display screen in a single-channel form; and when the video stream provider provides two video streams, the separation module separates a picture displayed in the display screen into two pictures respectively specific to the two video streams to realize double-view display, and wherein the display panel further comprises a comparison module, the input end of the comparison module is connected with the output end of the video stream provider, the output end of the comparison module is connected with the input end of the separation module, and the comparison module is used for judging whether the video signal source comprises two video streams and controlling the separation module to be turned on or off based on the judging result.

2. The display device of claim 1, wherein the separation module is arranged on one side, close to audiences or far from audiences, of the display panel.

3. The display device of claim 2, further comprising a processing module for coding two video streams to form the video signal source, wherein the coding comprises image rearrangement or image interpolation.

4. The display device of claim 3, wherein the processing module is arranged in the video stream provider; or, the display panel further comprises a drive circuit electrically connected with the display screen, and the processing module is arranged in the drive circuit.

5. The display device of claim 4, wherein the drive circuit further comprises a signal conversion module for converting the signal format of the received coded video signal source and inputting the converted video signal source to the display screen.

6. The display device of claim 5, wherein the signal format output by the processing module is DVI, the signal format input to the display screen is LVDS, and the signal conversion module converts a DVI signal into an LVDS signal.

7. The display device of claim 2, wherein the separation module is a controllable active grating.

8. The display device of claim 7, wherein the active grating is a twisted nematic liquid crystal cell, and matched polarizers are arranged in the display screen and the twisted nematic liquid crystal cell.

9. The display device of claim 1, wherein the two pictures respectively specific to the two video streams are displayed on the display screen in a regional interval manner, and the regional interval manner comprises a row regional interval manner, a column regional interval manner or a block regional interval manner.

10. The display device of claim 2, wherein the two pictures respectively specific to the two video streams are displayed on the display screen in a regional interval manner, and the regional interval manner comprises a row regional interval manner, a column regional interval manner or a block regional interval manner.

11. The display device of claim 1, wherein the two pictures respectively specific to the two video streams are displayed on the display screen in a regional interval manner, and the regional interval manner comprises a row regional interval manner, a column regional interval manner or a block regional interval manner.

12. The display device of claim 3, wherein the two pictures respectively specific to the two video streams are displayed on the display screen in a regional interval manner, and the regional interval manner comprises a row regional interval manner, a column regional interval manner or a block regional interval manner.

13. The display device of claim 4, wherein the two pictures respectively specific to the two video streams are displayed on the display screen in a regional interval manner, and the regional interval manner comprises a row regional interval manner, a column regional interval manner or a block regional interval manner.

14. The display device of claim 5, wherein the two pictures respectively specific to the two video streams are displayed on the display screen in a regional interval manner, and the regional interval manner comprises a row regional interval manner, a column regional interval manner or a block regional interval manner.

15. A display method of a display device, wherein the display device comprises a display panel and a video stream provider, the display panel comprises a display screen, a comparison module and a separation module, input end of the comparison module is connected with output end of the video stream provider, output end of the comparison module is connected with input end of the separation module, the display method comprising:
the video stream provider provides one or two video streams and codes the one or two video streams to form a video signal source, wherein
the video signal source is input to a display screen in a single-channel form for display;
the comparison module judges whether the video signal source comprises two video streams and controls the separation module to be turned on or off based on the judging result, and
when the video signal source comprises two video streams, the separation module separates a picture displayed in the display screen into two pictures respectively specific to the two video streams to realize double-view display.

16. The display method of claim 15, wherein the one or two video streams are provided by the same video stream provider, and are coded in the video stream provider; or the one or two video streams are coded in a drive circuit of the display screen.

17. The display method of claim 15, wherein the inputting the video signal source to a display screen in a single-channel form specifically comprises: converting the signal format of the video signal source, and inputting the format-converted video signal source to the display screen.

18. The display method of claim 15, further comprising:
when the video signal source comprises a single video stream, keeping displaying the picture in the display screen.

* * * * *